United States Patent

[11] 3,574,344

| [72] | Inventor | Theodore C. Wallace |
| | | Midland, Mich. |
| [21] | Appl. No. | 839,416 |
| [22] | Filed | July 7, 1969 |
| [45] | Patented | Apr. 13, 1971 |
| [73] | Assignee | The Dow Chemical Company |
| | | Midland, Mich. |

[54] BLENDING OF PARTICULATE MATERIALS IN PREDETERMINED QUANTITIES
7 Claims, 2 Drawing Figs.

| [52] | U.S. Cl. | 259/18 |
| [51] | Int. Cl. | B01f 5/00 |
| [50] | Field of Search | 259/18– |
| | | –27, 4–10, 154 |

[56] References Cited
UNITED STATES PATENTS

| 3,182,969 | 5/1965 | Rupp | 259/25 |
| 3,243,856 | 4/1966 | Dietert et al. | 259/18X |
| 3,348,818 | 10/1967 | Avril | 259/4X |

Primary Examiner—Dave W. Arola
Attorneys—Griswold and Burdick, Richard G. Waterman and Robert B. Ingraham ABSTRACT: Pigments in a polymer particle are blended in predetermined quantities employing two weighing hoppers. The hopper weighing the larger particle size material is discharged through the hopper weighing the smaller particle size material, thereby eliminating "hangup" or adherence of the finer material to the weighing hopper.

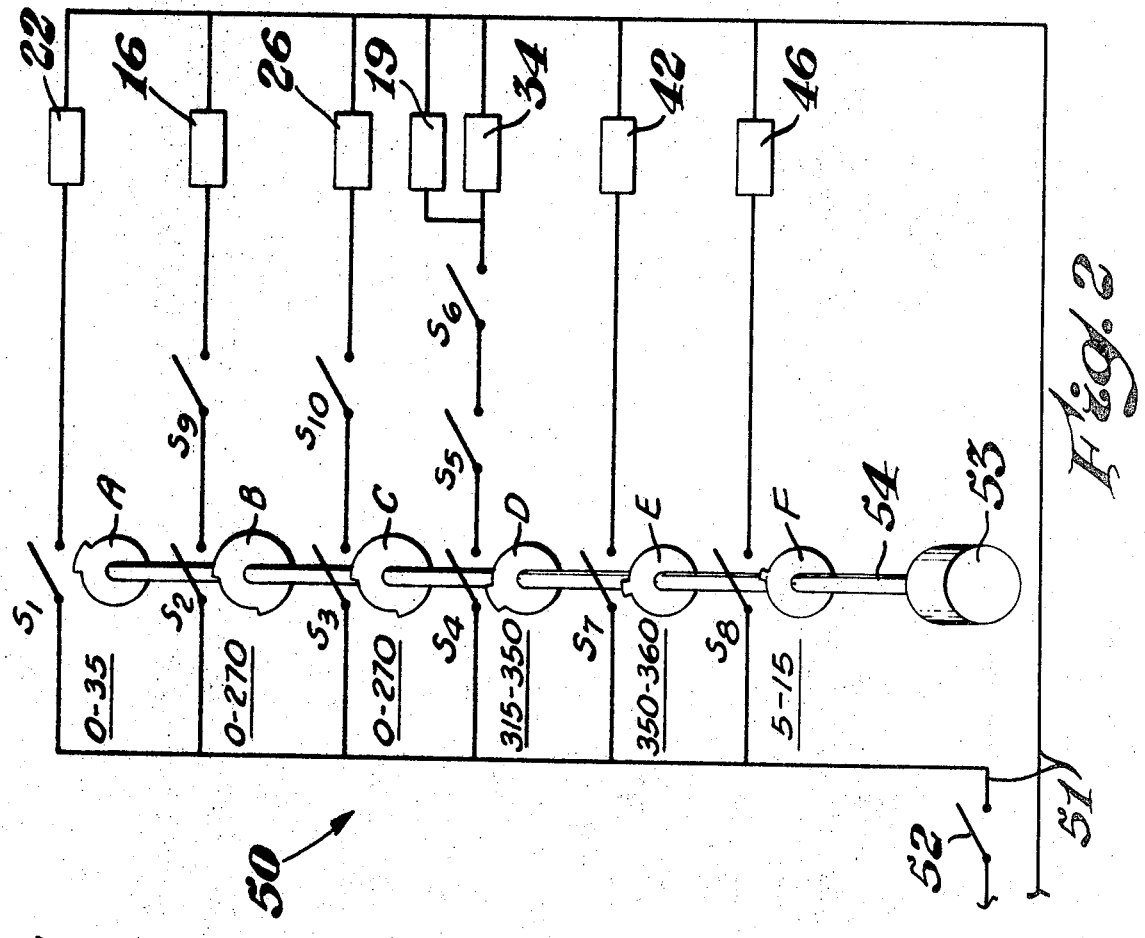
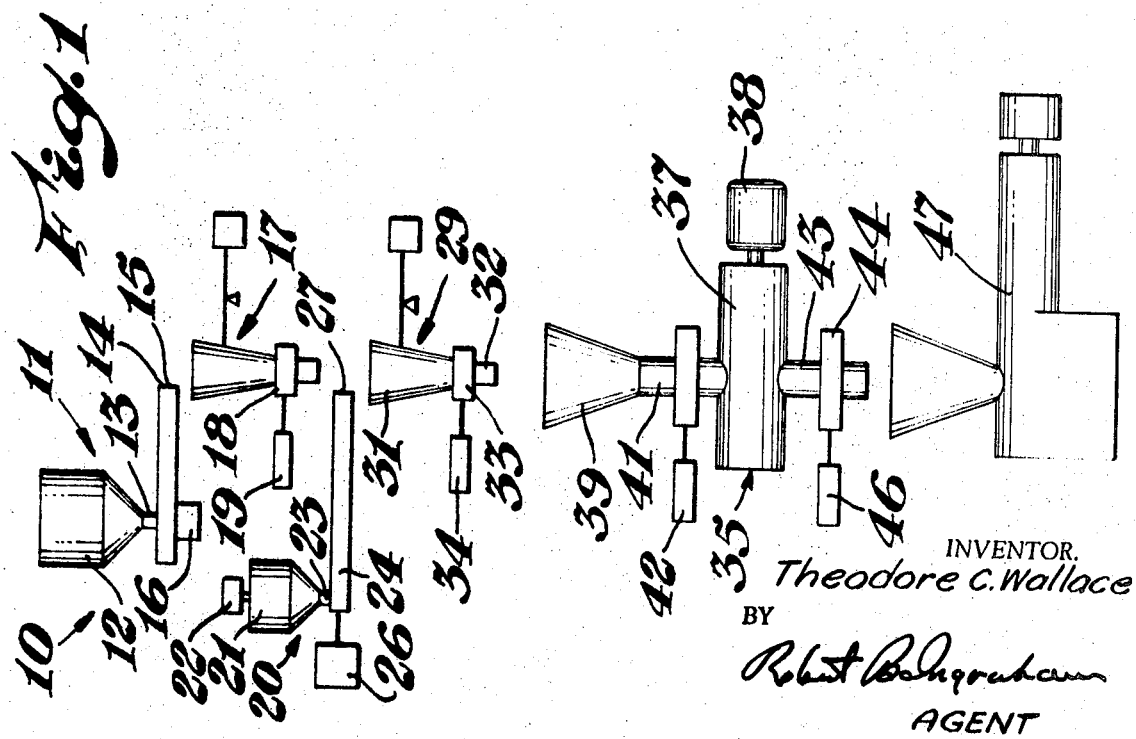

BLENDING OF PARTICULATE MATERIALS IN PREDETERMINED QUANTITIES

Considerable difficulty has been encountered in the blending of fine particle size materials with larger particle size materials such as the blending of a dust with granules as is often the case when pigments and polymers are blended. Frequently, the polymers, such as thermoplastic polymers, are provided in the form of relative dustless granules of generally cylindrical or spherical form and dimensions varying from about one thirty-second inch to one-eighth inch or even three-sixteenths inch. Frequently, it is desirable to add finely divided dustlike materials, such as pigments, stabilizers and the like, to a body of granules in a predetermined quantity. This is readily accomplished by weighing predetermined quantities of such materials and dry blending. Often such a dry blend is fed to a heat fabricating apparatus where it is reextruded into colored pellets or an article of desired shape. Sometimes such blends are directly molded to give a desired product. Various weighing feeding mechanisms are known which deliver a predetermined weight of material in a given period of time. These devices have been found less than entirely satisfactory particularly when pigments or coloring materials are being blended with thermoplastic resins. The appearance of the final product is very sensitive to the proportion of pigment or coloring matter incorporated therein. Usually the amount of pigment or coloring matter is present at a level below about 2 weight percent and oftentimes below about 1 weight percent. Thus, a relatively small quantity of a finely divided powder is being disposed in a relatively large quantity of a relatively coarse granular material. In a continuous blending of these materials by weight, substantial variation in composition can occur if for some reason the feed of pigment is nonuniform. For example, if one assumes that 100 weight units of polymer are provided by a weighing dispenser over a period of 1 hour and one weight unit of pigment is provided over the hour, the produce would contain 100 parts of polymer and one part of pigment. Generally on the average, this holds true. However, minor buildup, sticking of the finely divided pigment in the blending apparatus, can cause considerable variations of pigment concentration which would render the hour's production of polymer unsuitable for the preparation of 100 parts of polymer having a desired identical appearance. Various methods have been employed to overcome this problem, including the preparation of pigment concentrates, blending of large batches of polymer and pigment. However, such techniques offer substantial disadvantage from a standpoint of equipment and labor required and oftentimes in the quality of the product obtained.

It would be beneficial if there were available an improved method and apparatus for the blending of finely divided particulate material with granular material.

It would also be desirable if there were available an improved method and apparatus for the gravometric blending of particulate materials wherein relatively small uniform quantities of material could be blended in a continual manner.

It would also be desirable if such a blending method and apparatus were available which exhibited a high reliability in producing a uniform admixture of the particulate materials to be blended.

These benefits and other advantages in accordance with the present invention are achieved in a method for the admixture of a first particulate material having free-flowing characteristics and a second particulate material having a particle size substantially smaller than the first material, wherein predetermined quantities of the first and second materials are continually weighed, mixed and discharged as a blended mixture, the improvement which comprises weighing the first particulate material in a first material weighing means, weighing a predetermined quantity of a second material in a second material weighing means, discharging the first weighing means into the second weighing means and the second weighing means into a mixing means.

The method of the present invention is practiced with particular advantage employing the apparatus of the present invention which comprises in cooperative combination a first supply means adapted to supply a first particulate material, a first material weighing means adapted to weight a predetermined quantity of the first particulate material, a second particulate material supply means adapted to supply a second particulate material, a second particulate material weighing means adapted to weigh a predetermined quantity of the second particulate material, first and second discharge means in operative association with the first and second weighing means, a mixing means adapted to receive material from the second discharge means, the first discharge means adapted to discharge material from the first weighing means into the second weighing means, the second discharge means adapted to discharge material into the mixing means whereby the first and second materials are discharged to the mixing means.

Further features and advantages of the present invention will become more apparent from the following specification taken in connection with the drawing wherein:

FIG. 1 schematically depicts one embodiment of the invention without control circuitry.

FIG. 2 schematically depicts control circuitry suitable for the apparatus of FIG. 1.

In FIG. 1 there is schematically depicted a blending apparatus generally designated by the reference numeral 10 suitable for the continual blending of particulate materials. The apparatus 10 comprises in cooperative combination a first particle dispensing means 11. The first particle dispensing means 11 comprises a supply means or hopper 12 having a discharge 13 in operative association with a conveying means 14 such as a vibratory conveyor. The conveying means 14 has a discharge end 15 and a vibrator or actuator 16. A first material weighing means 17 is disposed adjacent the discharge end 15 of the conveyor 14 and is adapted to receive particulate material discharged therefrom. The first weighing means 17 has a first discharge means 18 in operative combination therewith and a discharge means activator 19. Beneficially, the discharge means 18 may be a slide valve, star valve or other suitable means and the activating means 19 a linear actuator such as a pneumatic cylinder, solenoid or source of rotary motion such as an electric motor. The weighing means 17 beneficially may be of any well known commercially available variety which operates on the balance principle, strain gauge or the like. Advantageously, the first weighing means 17 receives a predetermined amount of the first particulate material from the hopper 12. When a predetermined quantity is contained in the weighing means 17, feed from the hopper 12 is discontinued. A second particulate material supply means 20 is disposed generally adjacent the first weighing means 17. The second particulate supply means 20 is employed to provide the finely divided particulate or powdery material such as pigment. The second supply means 20 comprises a hopper 21 having an agitator assembly 22 adapted to agitate powder within the hopper 21. A discharge 23 is in operative communication with a screw conveyor 24 having a screw drive or motor 26. The conveyor 24 has a discharge 27 adapted to discharge particulate material into a second weighing means 29. The second weighing means 29 has a hopper 31. A discharge 32 having a valve 33 is selectively opened by a slide valve actuator 34. The weighing means 29 beneficially is similar to the weighing means 17. The hopper 31 is adapted to receive particulate material discharged from the discharge means 18 of the first weighing means 17. Thus, the second weighing means 29 receives material from the second supply means 20 and from the first weighing means 17. Adjacent the second weighing means 29 is a mixing or blending apparatus 35. Beneficially, the apparatus 35 may be a ribbon-type mixer, double cone blender or like well known apparatus for the blending of particulate solids. The mixing apparatus 35 has a body 37 having an internal cavity and agitator, not shown. An agitator drive means or motor 38 is in operative combination with the agitator. The mixing assembly 35 has an inlet hopper 39 which is in communication with the interior of the mixer by means of a slide valve 41 having a slide valve actuator 42. The mixing assembly 35 has a discharge conduit 43 having therein a slide valve 44 actuated by a valve actuator 46. Adjacent the discharge 43 of the mixer 35 is a heat fabricating apparatus or extruder 47 adapted to receive and further process material from the discharge 43 of the mixing assembly 35.

In FIG. 2 there is schematically depicted control circuitry, generally designated by the reference numeral 50, for the apparatus of FIG. 1. The circuitry 50 comprises a line or means to supply electrical power 51, a power control switch 52, a synchronous timing motor 53 having a shaft 54 upon which are mounted a plurality of cams A, B, C, D, E and F controlling switches $S_1$, $S_2$, $S_3$, $S_4$, $S_7$ and $S_8$, respectively. Switch $S_1$ is in series with the pigment agitator 22 and is adapted to close $S_1$ on the first 35° of revolution of the shaft 54. Switch $S_2$ is in series with the actuator 16 of the conveyor 15 and is closed for the first 270° of revolution of the cam B. Switch $S_3$ controlled by cam C is in series with the motor 26 of the conveyor 27. A switch $S_9$ is in series with switch $S_2$ and opens when the first weighing means 17 receives a predetermined amount of material. A switch $S_{10}$ is in series with switch $S_3$ and opens when the weighing means 29 receives a predetermined quantity of material. Switch $S_4$ is activated by cam D and is in series with switches $S_5$ and $S_6$ which control the power to the activators 19 and 34. Switch $S_5$ is in operative communication with the first weighing means 17 and switch $S_6$ is in operative combination with the second weighing means 29. Switches $S_5$ and $S_6$ are closed when the weighing means 17 and 29 have received a predetermined quantity of particulate material. Switch $S_4$ is closed when the cam D has rotated from 315° to about 350°. Switch $S_7$ is controlled by cam E and is in series with the actuator 42 of the valve 41 on the mixer hopper 39 and is activated when the cam E is rotated from about 350° to about 360°. Cam F operates switch $S_8$ which is in series with the actuator 46 of the valve 44 and therefore controlling the discharge of the mixer 35.

In operation of the apparatus of FIGS. 1 and 2, the first and second supply means are provided with the desired particulate materials to be blended wherein the pelleted or larger particle size material is disposed in the first feed material 11 and the finer material placed in the second supply means 20. On closing switch $S_2$, the agitator in the second supply means 20 is activated. Through switch $S_1$ by cam A, particulate material is discharged from the discharge 15 of the conveyor 14 into the first weighing means 17 by activation of the actuator 16 through switches $S_2$ and $S_9$ which are closed until a predetermined weight has been added to the weighing means 17. Similarly, the motor 26 of the second conveyor 24 feeds the finer particulate material to the second weighing means 29 until a predetermined quantity of material is added and switch $S_{10}$ opens. On further rotation of the cams, switch $S_4$ is closed. Switches $S_5$ and $S_6$ have been closed by the weighing means 17 and 29, thereby actuating the valve actuators 19 and 34 opening the valves 18 and 33. Particulate material from the first weighing means 17 is discharged into the hopper 31 of the second weighing means 29. The material subsequently falls into the hopper 39 of the mixing assembly 35. As the coarser particulate material from the first weighing means 17 passes through the hopper 31 of the second weighing means 29, the finer particulate material in effect is scoured therefrom. Switch $S_7$ is closed at about the time switch $S_4$ opens, discharging the contents of the hopper 39 into the mixing assembly 35. After a predetermined period, as determined by the speed of rotation of the shaft 54, the valve actuator 46 is activated, opening the valve 44, discharging the blended particulate materials into the processing apparatus 47 or storage or shipping containers. Each rotation of the shaft 54 provides weighed quantities of the two particulate materials and effectively delivers these materials to the mixing apparatus without substantial or significant danger of hangup or lodging of portions of the finer particulate material in the weighing means 29. Thus, weighed quantities of the particulate materials are provided sequentially having a high degree of uniformity.

Apparatus substantially in accordance with that depicted in FIG. 1 is eminently successful for blending powdered pigments with polystyrene granules having a diameter of about one-eighth inch and a length of about three-sixteenths inch. Such pigments as carbon black, titanium dioxide and without buildup in the second weighing means 29 or in the mixing apparatus 35.

As is apparent from the foregoing specification, the present invention is susceptible of being embodied with various alterations and modifications which may differ particularly from those that have been described in the preceding specification and description.

I claim:

1. In a method for the admixture of a first particulate material having free-flowing characteristics and a second particulate material having a particle size substantially smaller than the first material, wherein predetermined quantities of the first and second materials are continually weighed, mixed and discharged as a blended mixture, the improvement which comprises:
    weighing the first particulate material in a first material weighing means;
    weighing a predetermined quantity of a second material in a second material weighing means;
    discharging the first weighing means into the second weighing means; and
    discharging the second weighing means into a mixing means whereby the first particulate material scours the second weighing means and removes the second material therefrom.

2. The method of claim 1 wherein the first particulate material is a synthetic resin in granular form.

3. The method of claim 2 wherein the second particulate material is a pigment in the form of a powder.

4. An apparatus for the weighing and blending of a first particulate material with a second particulate material, the apparatus comprising in cooperative combination:
    a first supply means adapted to supply a first particulate material;
    a first material weighing means adapted to weigh predetermined quantity of the first particulate material;
    a second particulate material supply means adapted to supply a second particulate material;
    a second particulate material weighing means adapted to weigh a predetermined quantity of a second particulate material;
    first and second discharge means in operative association with the first and second weighing means;
    a mixing means adapted to receive material from a second discharge means, the first discharge means adapted to discharge material from the first weighing means into the second weighing means, the second discharge means adapted to discharge material into the mixing means, whereby the first and second materials are discharged to the mixing means.

5. The apparatus of claim 4 including means to simultaneously open the first and second discharge means.

6. The apparatus of claim 4 including means to prevent discharge of the first and second weighing means until a predetermined quantity of material is present in both the first and second weighing means.

7. The apparatus of claim 4 including means to sequentially activate the first and second supply means, first and second discharge means, mixing means and mixing discharge means on a fixed time cycle.

(5/69)
CERTIFICATE OF CORRECTION

Patent No. 3,574,344     Dated 13 April 1971

Inventor(s) Theodore C. Wallace

It is certified that error appears in the above-identified patent and that said Letters Patent are hereby corrected as shown below:

In column 4, line 10, insert the following between the words "and" and "without":

-- the like are blended with a high degree of uniformity and --

Signed and sealed this 17th day of August 1971.

(SEAL)
Attest:

EDWARD M. FLETCHER, JR.
Attesting Officer

WILLIAM E. SCHUYLER, JR
Commissioner of Patents